(12) United States Patent
Humphrey

(10) Patent No.: US 8,407,931 B1
(45) Date of Patent: Apr. 2, 2013

(54) TRAPPING METHOD AND APPARATUS

(75) Inventor: John Humphrey, Gainesville, FL (US)

(73) Assignee: The United States of America as Represented by the Secretary of Agriculture, Washington, DC (US)

(*) Notice: Subject to any disclaimer, the term of this patent is extended or adjusted under 35 U.S.C. 154(b) by 160 days.

(21) Appl. No.: 12/896,034

(22) Filed: Oct. 1, 2010

(51) Int. Cl.
*A01M 23/00* (2006.01)

(52) U.S. Cl. ..................................... 43/61; 43/65; 43/67

(58) Field of Classification Search ................ 43/58, 60, 43/61, 62, 63, 67, 65; *A01M 23/00, 23/02, A01M 23/08, 23/16, 23/18, 23/20*
See application file for complete search history.

(56) References Cited

U.S. PATENT DOCUMENTS

| | | | | |
|---|---|---|---|---|
| 117,005 A | * | 7/1871 | Smith | 43/67 |
| 4,452,004 A | * | 6/1984 | Matsuura | 43/61 |
| 4,829,700 A | * | 5/1989 | Ha | 43/61 |
| 5,329,723 A | * | 7/1994 | Liul | 43/61 |
| 5,778,594 A | | 7/1998 | Askins et al. | |
| 5,862,624 A | | 1/1999 | Askins | |
| 6,609,327 B2 | * | 8/2003 | Stoico et al. | 43/61 |
| 6,684,560 B2 | * | 2/2004 | Lafforthun | 43/61 |
| 2007/0277425 A1 | | 12/2007 | Beck | |
| 2008/0115405 A1 | * | 5/2008 | Bucher | 43/61 |
| 2010/0115823 A1 | * | 5/2010 | Watson | 43/61 |

FOREIGN PATENT DOCUMENTS

JP 2012039928 A * 3/2012

OTHER PUBLICATIONS

English-language translation of JP 2012-039928 A.*

* cited by examiner

*Primary Examiner* — Darren W Ark
*Assistant Examiner* — Lisa Tsang
(74) *Attorney, Agent, or Firm* — John Fade; Robert D. Jones; Lesley Shaw

(57) ABSTRACT

Snake trap primarily designed to capture relatively long and heavy snakes such as the Burmese Python. The trap is specifically configured to avoid inadvertently capturing non-targeted animals by using at least two weight/pressure-sensing plates. Each pressure plate has an independent release mechanism so that both pressure plates must be in a depressed position to spring the trap.

18 Claims, 4 Drawing Sheets

TRAPPING METHOD AND APPARATUS

FIELD OF THE INVENTION

The present invention relates to a method and apparatus for trapping animals. Specifically, the invention relates to a method and apparatus for trapping and holding relatively large live snakes such as the Burmese python.

BACKGROUND OF THE INVENTION

In recent years, snakes from around the world have been turning up in U.S. wetland areas. For example, Burmese pythons, one of the largest snake species on earth, are now known to be breeding in the Florida Everglades and spreading rapidly throughout South Florida. Nearly 1,000 pythons have been removed from the Florida Everglades National Park and surrounding areas since 2002—likely representing only a fraction of the total population.

The presence of exotic snakes often results from their intentional release by pet owners. These snakes can have devastating consequences to the ecosystem. Burmese pythons feed on a wide variety of birds and mammals in the Everglades. By preying on native wildlife, and competing with other native predators, pythons are seriously impacting the natural order of south Florida's ecological communities. Their voracious appetite can further threaten many endangered species and move other species closer to endangered status. Further, the snakes are increasingly turning up in backyards and gardens of homes adjacent to wetland areas.

The need exists for a trapping system that can capture the snakes so that they can be further studied and/or eradicated. The current invention comprises a safe and efficient trap designed specifically for large snakes. The design of the trap precludes the possibility of inadvertently trapping smaller animals that to do not meet the size requirements of the trap's capture mechanism.

SUMMARY OF THE INVENTION

The current invention is directed to a method and apparatus for trapping a snake. The trap comprises a trap door assembly in communication with proximal and distal pressure-sensitive elements. The trap is designed so that both the proximal and distal elements are moved to a depressed position to spring the trap.

DETAILED DESCRIPTION OF PREFERRED EMBODIMENTS

Figure 1:
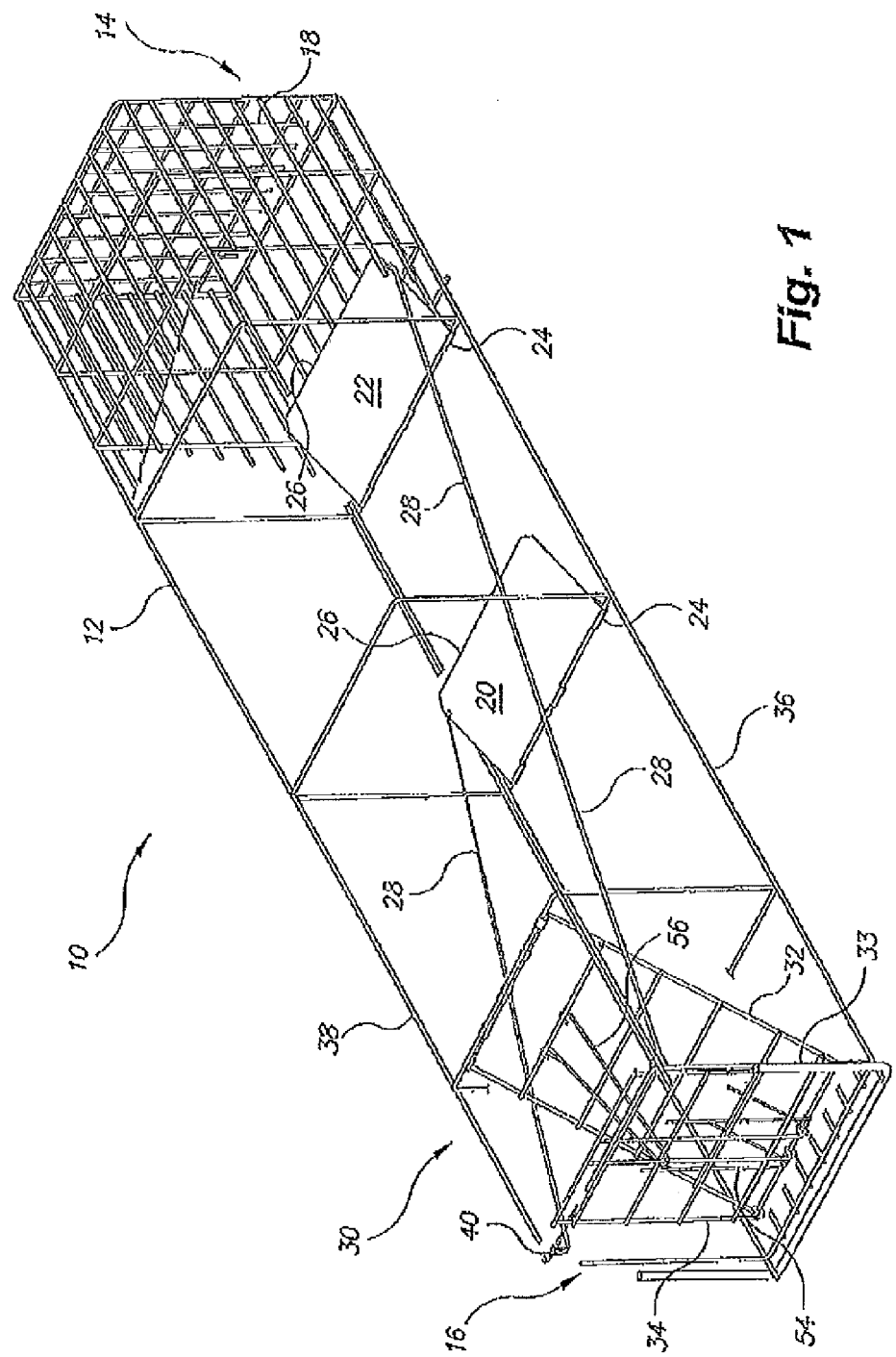
FIG. 1 is an elevational perspective schematic of the snake trap of the current invention. The trap door assembly is shown in the "capture" position.

The present invention comprises a trapping mechanism 10 primarily for trapping large elongated animals such as the Burmese python. The trap 10 comprises an elongated body 12 with a closed end 14 and an open end 16. The "closed end" 14 may include a removable panel to facilitate the extraction of a captured animal. The closed end 14 may also be attached directly to a capture bag/box or the like. In the preferred embodiment, the trap body 12 is comprised of a matrix 18 of lateral and longitudinal metal bars that form a mesh sized and configured to retain a targeted animal within the body 12 of the trap 10. An exemplary section of the matrix 18 is shown in FIG. 1.

For the sake of simplicity, only an outline of the trap 10 is shown in FIG. 1, however it should be understood that in the preferred embodiment essentially the entire body 12 of the trap 10 is covered by the metal matrix 18. In alternative embodiments, the body 12 may have any design and may be comprised of any material sufficient to maintain a target animal in the trap 10.

In the preferred embodiment, the trap body 12 includes a plurality of pressure-sensitive elements 20, 22 that sense the presence of an animal in the trap 10. Specifically, the current invention comprises at least a proximal pressure plate 20 and a distal pressure plate 22 that are arranged in tandem. A compression spring or other variable resistance mechanism may be used to vary the amount of weight/force necessary to depress each of the pressure plates 20, 22. Each pressure plate 20, 22, has a hinged side 24, and an elevated side 26. A release linkage 28 is attached on or in the proximity of the elevated side 26 of each plate 20, 22. The release linkage 28 associated with the distal plate 22 is longer than the linkage 28 associated with the proximal plate 20, however the linkages 28 are otherwise essentially the same.

In alternative embodiments, the distance between the proximal 20 and distal 22 plates may vary and the trap 10 may include more than two pressure plates 20, 22. Further, the size, shape and location of the pressure plates 20, 22 may be varied to accommodate the characteristics of a target animal. Although the preferred embodiment includes rod-shaped linkage 28, the linkages may have any form known in the art and may include a configuration whereby the pressure plates 20, 22 communicate wirelessly with other portions of the trap so that there is an electronic linkage but no tangible physical linkage.

As best shown in FIG. 1, the linkages 28 are attached to a trap door assembly 30 disposed adjacent to the open end 16 of the trap body 12. FIG. 1 shows the trap door assembly 30 in the "capture" position. The trap door assembly 30 primarily comprises a trap door 32, a bracing plate 34, and release mechanisms 40. In the preferred embodiment, the trap door 32 and the bracing plate 34 comprise the same metal matrix construction 18 that comprises the body 12 of the trap 10.

Figure 2:
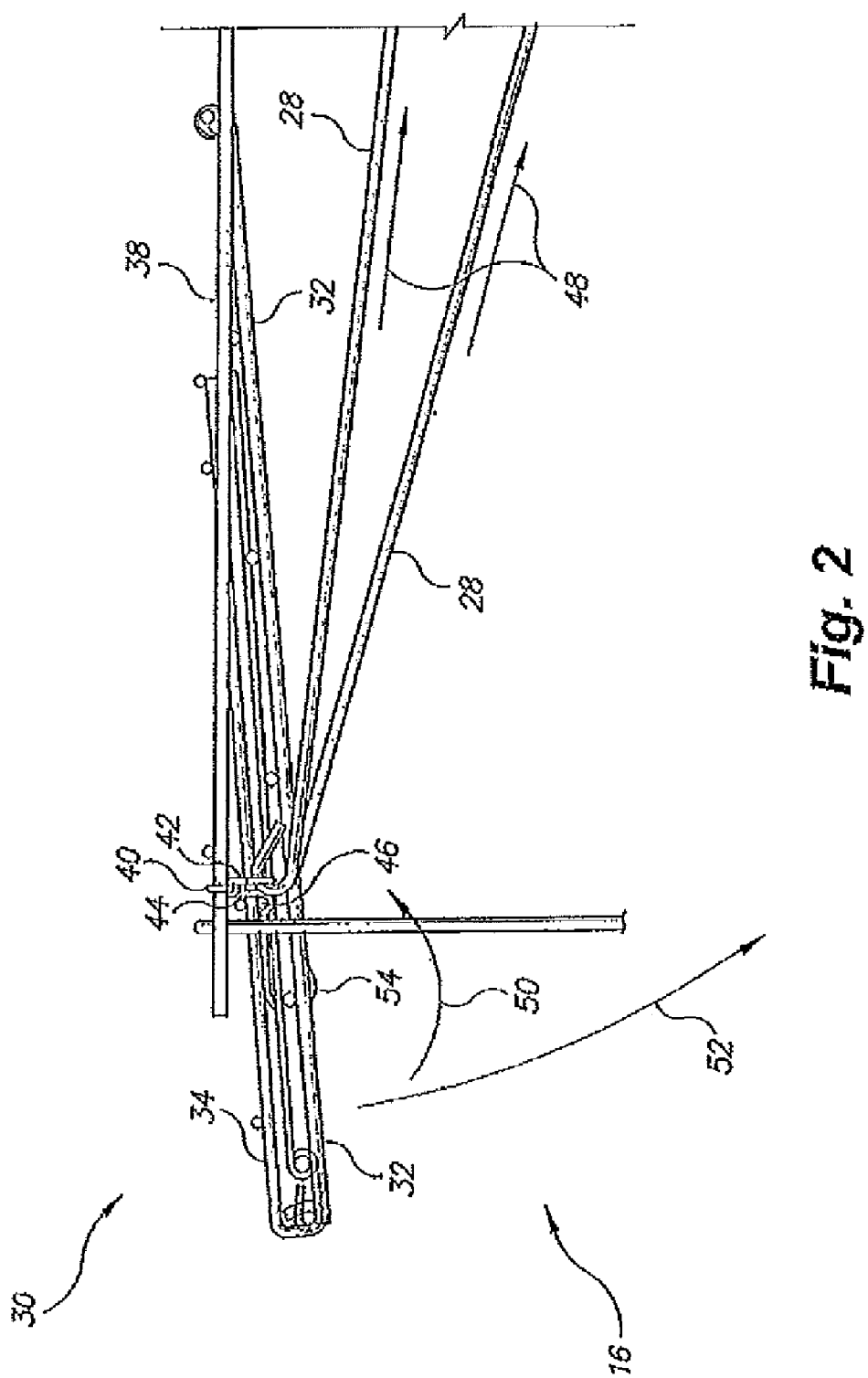
FIG. 2 is a partial sectional schematic of the trap door assembly in the "set" position.
Figure 3:
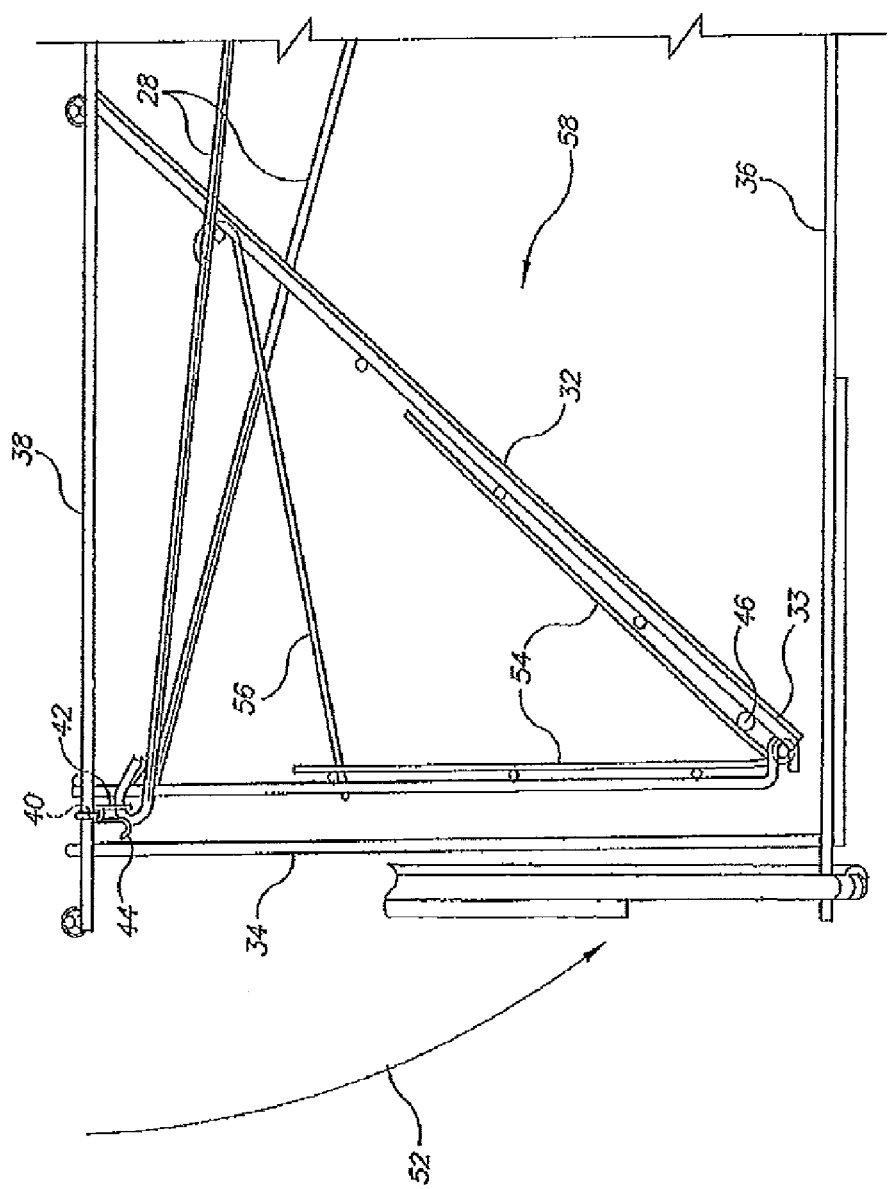
FIG. 3 is a partial sectional schematic of the trap door assembly in the "capture" position.

FIGS. 1 and 3 show the trap door assembly 30 in the "capture" position so that the trap door 32 effectively obstructs the open end 16 of the trap 10, and thereby prevents the escape of an animal present within the trap 10. However, in the "set" position (shown schematically in FIGS. 2 and 4) the trap door 32 and bracing assembly 34 are essentially folded upwardly so that the open end 16 of the trap 10 is unobstructed thereby allowing animals to enter and leave the trap 10.

Figure 4:
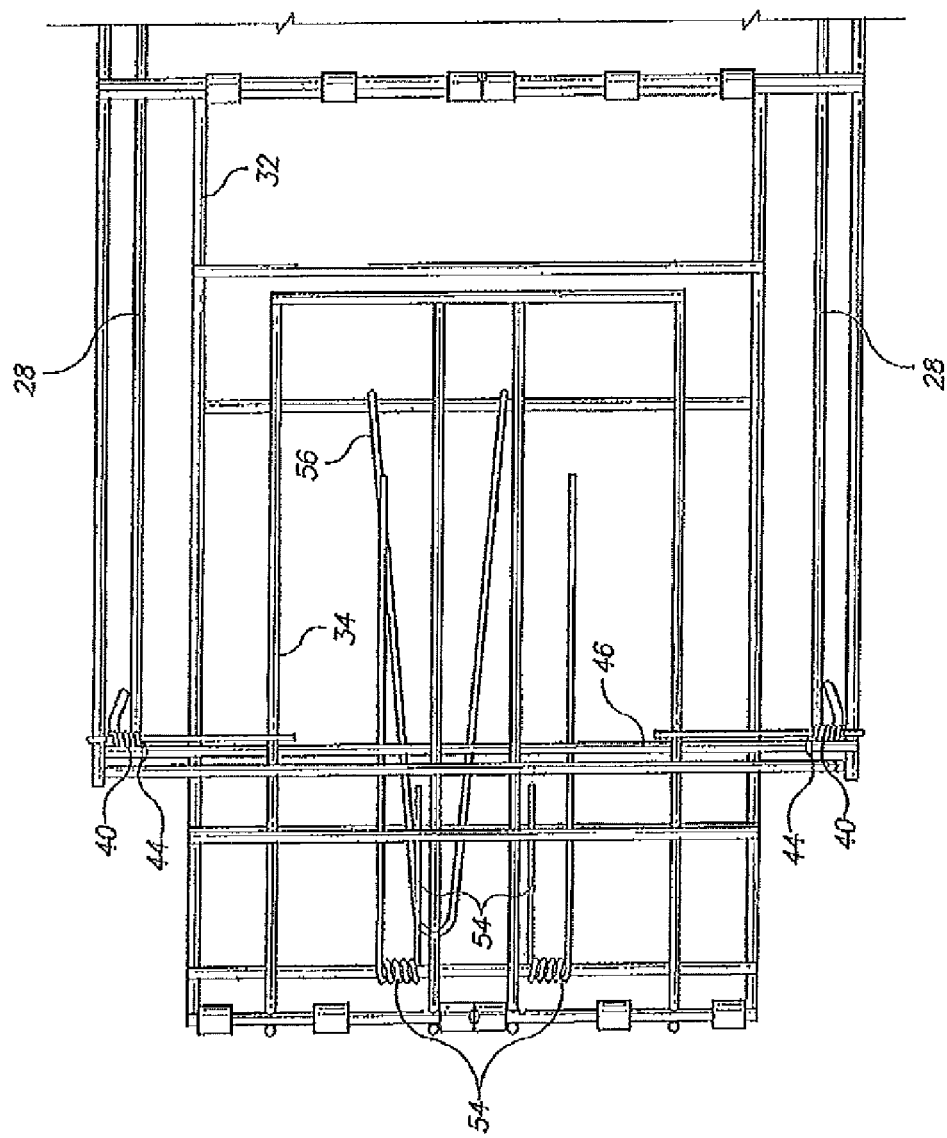
FIG. 4 is a partial top view of the trap door assembly in the "set" position.

FIGS. 2-4 primarily show the components of the trap door assembly 30. The function of the trap door assembly 30 is discussed in greater detail infra.

FIG. 2 is a partial sectional schematic of the trap door assembly 30 in the "set" position. As shown in FIG. 2, in the "set" position, the trap door 32 and bracing plate 34 fold upwardly and are secured adjacent to a top portion 38 of the trap 10 at the open end 16 of the trap body 12. The trap door 32 is held in the "set" position by a pair of release mechanisms 40. One end of each release mechanism 40 comprises a release lever 42 that is connected to the release linkage 28, and the other end of the release mechanism 40 is a retain/release hook 44. The retain/release hook 44 engages a lateral bar 46 on the trap door 32 so that the hook 44 holds the trap door 32 and bracing plate 34 in the upwardly folded "set" position.

As best shown in FIG. 4, the current invention comprises two essentially identical but independent release mechanisms 40. Each release mechanism 40 is associated with a separate release linkage 28. As described above and best shown in FIGS. 1 and 4, a release linkage 28 is associated with each of the proximal 20 and distal 22 pressure plates. Consequently the release mechanism 40 associated with each of the respective pressure plates 20, 22 independently retains the trap door assembly 30 in the "set" position so that both release mechanisms 40 must be triggered to spring the trap 10.

Essentially, when an animal enters the trap 10, the animal depresses one or both of the pressure plates 20, 22 causing the release linkage 28 to move in the direction of the arrow 48 shown in FIG. 2. The release mechanisms 40 are configured so that when the release linkage 28 moves rearward, the associated release/retain hook 44 also moves generally rearward in the direction of the arrow 50 shown in FIG. 2 and thereby disengages with the lateral bar 46 of the trap door 32. As long as an associated pressure plate 20, 22 remains in a depressed position, the release/retain hook 44 will remain disengaged with the lateral trap door bar 46. However, if weight/pressure is removed from the pressure plate 20, 22, the non-hinged edge 26 of the pressure plate 20, 22 will return to the elevated position and the release/retain hook 44 will move forward and re-engage the lateral bar 46 of the trap door 34.

If both pressure plates 20, 22 are in the depressed position at the same time, both release/retain hooks 44 (FIG. 4) will pivot rearward in the direction of the arrow 50 and the trap door assembly 30 will swing downwardly in the direction of the arrow 52 (FIGS. 2 and 3) until a bottom edge 33 of the trap door 32 contacts a floor portion 36 of the trap body 12, thereby moving the trap door assembly 30 from the "set" to the "capture" position shown in FIGS. 1 and 3. Note that if only one of the pressure plates 20, 22 is depressed, the trap door assembly 30 will remain in the "set" position generally shown in FIGS. 2 and 4.

As best shown in FIG. 3, the trap door assembly 30 also includes some additional components that generally prevent an animal from forcing the trap door 32 into an open position once the door 32 is closed and the animal is trapped. As the trap release/retain hooks 44 release the trap door 32 and the door 32 begins to swing in the direction of the arrow 52, a helical torsion spring 54 disposed between the trap door 32 and the bracing plate 34 forces the bracing plate 34 outwardly away from the trap door 32 until a retaining linkage 56 stops the travel of the bracing plate 34.

As best shown in FIG. 3, when the trap door 32 is closed and the retaining linkage 56 is fully extended, the bracing plate 34 is in an essentially vertical position. The vertical position of the bracing plate 34 in the "capture" position is critical because a trapped animal will attempt to escape by exerting a force on the trap door 32 in the direction of the arrow 58 (FIG. 3). However, the vertically positioned bracing plate 34 acts as a support brace that holds the bottom edge 33 of the trap door 32 against the trap floor 36 and thereby prevents the door 32 from swinging upwardly and into an open position.

In summary, when an animal enters a trap 10 that is in the "set" position, the animal may depress one or the other of the pressure plates 20, 22 however, if only a single plate 20, 22 is depressed, the trap will not close because (as described supra) each pressure plate 20, 22 is attached to an independent release mechanism 40 and each mechanism 40 is capable of independently retaining the trap 10 in the "set" position. If a single pressure plate 20, 22 is depressed and then the pressure is removed, the components of the affected release mechanism 40 will "reset" to the original position. The trap will only spring if both pressure plates 20, 22 are in a depressed position at the same time.

This is an important and distinguishing feature of the current invention because it prevents non-targeted animals from being inadvertently captured. The trap 10 is designed so that essentially only an elongated animal of sufficient length and weight to depress both pressure plates 20, 22 can spring the trap 10. Specifically, the inventors have designed the trap 10 so that essentially only a large snake (or the like) can activate the trap 10.

Once a target animal enters the trap 10 and both pressure plates 20, 22 are in a depressed position, the release linkages 28 associated with each of the pressure plates 20, 22 are moved rearward in the direction of the arrow 48 (FIG. 2). As best shown in FIGS. 2 and 4, the linkages 28 are attached to release mechanisms 40 comprising a release lever 42 and a retain/release hook 44. When a release linkage 28 moves rearward, the release/retain hook 44 also moves generally rearward in the direction of the arrow 50 (FIG. 2). When both release/retain hooks 44 pivot rearward, the trap door 32 is released.

As the trap door 32 is released it swings downwardly in the direction of the arrow 52 (FIGS. 2 and 3) until a bottom edge 33 of the trap door 32 contacts the floor 36 of the trap 10, as best shown in FIGS. 1 and 3. Additionally, as the trap door 32 swings downwardly, a helical torsion spring 54 disposed between the trap door 32 and the bracing plate 34 forces the bracing plate 34 outwardly until the bracing plate 34 is essentially in a vertical position. The position of the bracing plate 34 maintains the bottom edge 33 of the trap door 32 in a position adjacent to the trap floor 36 and thereby ensures that the trap 10 remains closed.

For the foregoing reasons, it is clear that the invention provides an innovative trap that may be used in multiple applications. The invention may be modified in multiple ways and applied in various technological applications. For example, the trap features may be modified to camouflage or conceal the trap. The trap may also be modified to enable the trap to float or otherwise increase the trap's success by appealing to the target animal's physical characteristics and behavior patterns. The current invention may be modified and customized as required by a specific operation or application, and the individual components may be modified and defined, as required, to achieve the desired result. For example, the relative dimensions of the trap may be altered and the trap may include more than two pressure plates. It is also possible that the trap could be used to capture animals other than snakes.

Although some of the materials of construction are generally described, all of the material associated with the trap may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:
1. A trap comprising:
   a single trap door assembly being disposed at a first end of the trap, a second end of the trap being effectively closed;

a proximal pressure-sensitive element connected to the trap door assembly by a first release linkage rod; and a distal pressure-sensitive element connected to the trap door assembly by a second release linkage rod, the distal pressure-sensitive element being independent of, and spaced away from, the proximal pressure-sensitive element;

wherein both the proximal and the distal elements are moved to a depressed position to spring the trap.

2. The trap of claim 1 wherein the trap is configured so that the trap door assembly has a set position and a capture position, wherein both the proximal and the distal pressure-sensitive elements must be in a depressed position for the trap door assembly to move from the set position to the capture position.

3. The trap of claim 2 wherein the proximal and distal pressure-sensitive elements are arranged in tandem.

4. The trap of claim 2 wherein the trap door assembly comprises at least a trap door, a bracing plate, and a plurality of independent release mechanisms.

5. The trap of claim 4 wherein each of the release mechanisms comprises a release/retain hook.

6. The trap of claim 4 wherein the trap is configured so that, in the capture position, the bracing plate holds one side of the trap door adjacent a floor of the trap.

7. The trap of claim 6 wherein in the capture position, the trap door covers one end of the trap and the bracing plate is in an essentially vertical position.

8. The trap of claim 6 further comprising a helical torsion spring disposed between the trap door and the bracing plate, a first end of the spring abutting the trap door and a second end of the spring abutting the bracing plate.

9. The trap of claim 6 wherein if one of the pressure-sensitive elements is depressed and then pressure is removed from the depressed pressure-sensitive element, the depressed pressure-sensitive element resets to an original position and the trap remains in the set position.

10. The trap of claim 1 wherein each of the proximal and distal pressure-sensitive elements comprise plates.

11. The trap of claim 10 wherein each of the proximal and distal pressure-sensitive elements has a hinged side and an elevated side.

12. The trap of claim 1 wherein the trap comprises a snake trap designed to capture a snake, the trap being structured so that the snake's body depresses the proximal and distal pressure-sensitive elements.

13. The trap of claim 12 wherein one end of the trap comprises a snake retention box or bag.

14. The trap of claim 12 wherein the trap comprises a mesh sized to retain the snake within the trap.

15. The trap of claim 14 wherein the mesh is comprised of metal.

16. A method of trapping a snake, the method comprising the steps of:

providing the trap described in claim 1, and placing the trap in a set position.

17. The method of claim 16 wherein in the providing step, the trap is configured so that the trap door assembly has the set position and a capture position, and both the proximal and the distal pressure-sensitive elements must be in a depressed position for the trap door assembly to move from the set position to the capture position.

18. The method of claim 17 wherein, in the providing step, if one of the pressure-sensitive elements is depressed and then pressure is removed from the depressed pressure-sensitive element, the independent release mechanism connected to the depressed pressure-sensitive element resets to an original position and the trap remains in the set position.

\* \* \* \* \*